No. 652,183. Patented June 19, 1900.
A. HINRICHS & J. KRÜGER.
SEAT TUBE FOR CYCLES.
(Application filed Jan. 27, 1899.)
(No Model.)
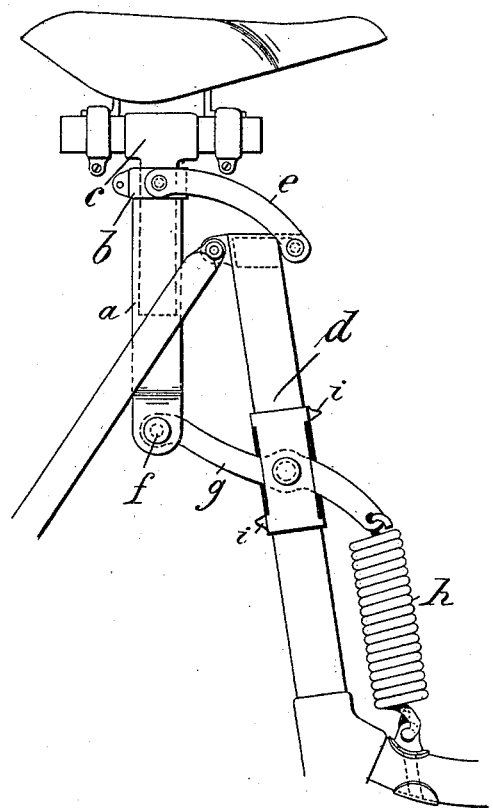
Witnesses:
L. B. Middleton
Inventor:
Albert Hinrichs
Julius Krüger.
by
Att'ys.

United States Patent Office.

ALBERT HINRICHS AND JULIUS KRÜGER, OF HAMELN, GERMANY.

SEAT-TUBE FOR CYCLES.

SPECIFICATION forming part of Letters Patent No. 652,183, dated June 19, 1900.

Application filed January 27, 1899. Serial No. 703,624. (No model.)

*To all whom it may concern:*

Be it known that we, ALBERT HINRICHS and JULIUS KRÜGER, subjects of the King of Prussia, Emperor of Germany, residing at Hameln, in the Kingdom of Prussia, German Empire, have invented certain new and useful Improvements in Seat-Tubes for Cycles, of which the following is a full, clear, and exact specification.

The subject of the present invention is an improved spring-bearing for the seat-tubes of cycles whereby the shaking and jarring ordinarily experienced in riding are prevented.

The accompanying drawing shows one form of carrying out the invention.

$a$ is the seat-tube, in which the seat-pin $c$ is vertically adjustable by means of a clip-ring $b$. The seat-tube $a$ is provided with guides $e$ on either side attached to the ring $b$ and to the head of the down-tube $d$. The lower end of the seat-tube is supported by the bolt $f$, attaching it to one arm of the lever $g$, pivoted to the down-tube $d$. The other end of this lever is connected to a spiral spring $h$, the lower end of which is secured to the lower part of the down-tube $d$ and is extended when the saddle is loaded.

$i$ $i$ are stops to limit the extent of movement of the lever $g$. In this manner if the cycle is suitably geared and there is little friction the weight of the rider will be carried by the spiral spring. The shocks and jarring experienced generally in riding are thus diminished, even though no pneumatic tires are used, and all the inconveniences connected with use of the latter are thus avoided. By means of the spring applied to the lower part of the cycle-frame the weight is most advantageously distributed.

We claim—

The combination in a bicycle comprising a frame having a down-tube or central vertical tube, of a seat-socket, a link pivotally connecting the socket to the tube, a lever working in parallelism with said link pivoted to the socket and tube, said lever having a rigid part extending on the opposite side of the tube to the seat-socket and a sustaining-spring interposed between said extension and the frame, substantially as described.

In witness whereof we have hereunto set our hands in presence of two witnesses.

ALBERT HINRICHS.
JULIUS KRÜGER.

Witnesses:
  MAX OTTO,
  KARL TESSMANN.